United States Patent
Bruss et al.

(10) Patent No.: US 8,195,609 B2
(45) Date of Patent: Jun. 5, 2012

(54) PROCESS CONTROL SEGMENTATION OF MASTER DATA

(75) Inventors: Ingo Bruss, Heidelberg (DE); Michael H. Bauer, Rastatt (DE); Horst F. Schaude, Kraichtal (DE); Christoph Kernke, Einhausen (DE)

(73) Assignee: SAP AG, Walldorf (DE)

( * ) Notice: Subject to any disclaimer, the term of this patent is extended or adjusted under 35 U.S.C. 154(b) by 1086 days.

(21) Appl. No.: 11/615,586

(22) Filed: Dec. 22, 2006

(65) Prior Publication Data
US 2008/0154619 A1  Jun. 26, 2008

(51) Int. Cl.
*G06F 17/30* (2006.01)
(52) U.S. Cl. .......... 707/636; 705/25
(58) Field of Classification Search .......... 707/999.001, 707/636, 999.201–999.202; 705/28, 300; 717/101, 102, 103
See application file for complete search history.

(56) References Cited

U.S. PATENT DOCUMENTS 6,005,571 A * 12/1999 Pachauri .......... 715/764
2004/0034668 A1 * 2/2004 Gotz et al. .......... 707/201

OTHER PUBLICATIONS

SAP, "Implementing People-Centric User Interfaces with Business Server Pages and SAP Enterprise Portal", Release CRM 5.0, 2003, pp. 1-284.*

* cited by examiner

*Primary Examiner* — Monica Pyo
(74) *Attorney, Agent, or Firm* — Schwegman, Lundberg & Woessner, P.A.

(57) ABSTRACT

A method of controlling transactions includes segmenting master data into separate process control data for a particular business process of a business organization, such as for example, materials to be the subject of transactions. A status may be set for each process control data. The method includes controlling storing of the process control data into the master data as a function of the status. Transactions may be processed using process control data as a function of the status of the corresponding process control data status.

18 Claims, 4 Drawing Sheets

Material: AHT Combi 110e

Material ID MCF-0002    Base Quantity Type Mass    Base Quantity/UoM 1.5 Kg

⚠ You have specified a negative amount as minimum order quantity.    | INCONSISTENCIES SHOWN AS WARNING SAVE STILL ALLOWED |

[ Save ][ Cancel ][ Close ][ Actions ▼ ][ Print ▼ ]

| Overview | Main Data | Processing | Inventory | Planning | Production | Sales | Delivery | Financials | Change History | Repor |

Sales Organizations

[ Add ][ Delete ][ Save as Template ]

| | Sales Organization ID | Sales Organization | Distribution Channel ID | Distribution Channel | Sales Status |
|---|---|---|---|---|---|
| 🖿 | SO0901201 | US Region North East & East Coast | DC0901221 | Wholesale Retail | Active |
| | SO0778002 | US Southern Region | DC0901221 | Wholesale Retail | In Preparation — 215 |

Sales Organization Details

[ Sales | Notes ]

Sales Details

Sales Quantity Type: [ Unit ▼ ]    Sales UoM: [ Each ▼ ]    Minimum Order Quantity: (-25) — 220

Pricing Group: [ ▼ ]    Rebate Group: [ Boiler (2300017) ▼ ]

Commission Group: [ ▼ ]    Item Category Group: [ ▼ ]

PROCESS CONTROL SEGMENTATION OF MASTER DATA

BACKGROUND

Software used to run businesses may include data that corresponds to both materials to be sold, and process controls defining business processes corresponding to the materials. Master data is a collection of all of the process controls associated with a business. Due to the complexity of master data, it is often not possible to maintain all the data of all the process controls for one master datum correctly at any given time. Failed consistency checks in one process control may prevent other process controls from being used.

BRIEF DESCRIPTION OF THE DRAWINGS

FIG. 2 is a screen shot of a user interface to a process control having a status of in preparation according to an example embodiment.

FIG. 3 is a screen shot of a user interface to a process control having a status of active according to an example embodiment.

DETAILED DESCRIPTION

Figure 1:
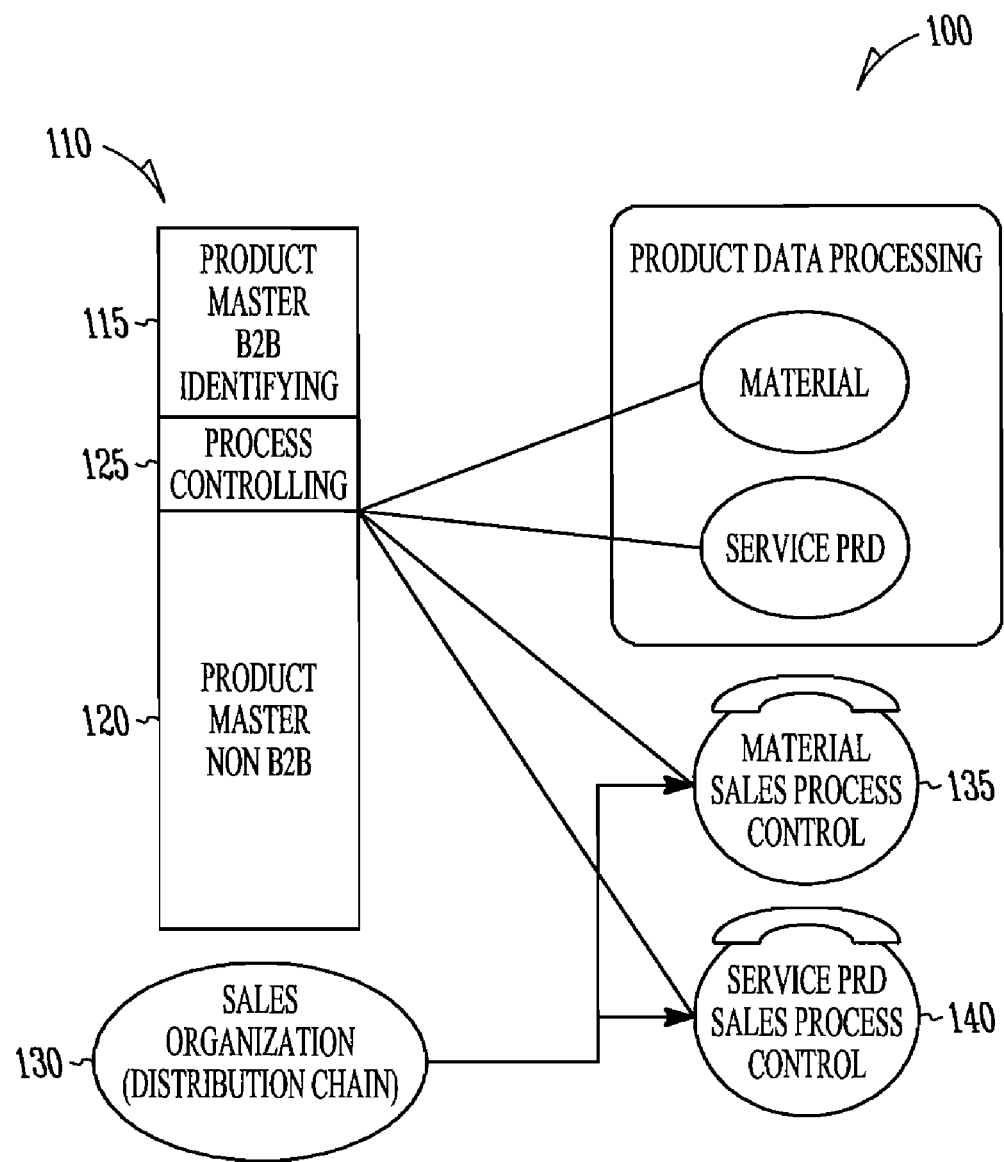
FIG. 1 is a block diagram illustrating a process control architecture according to an example embodiment.
Figure 4:
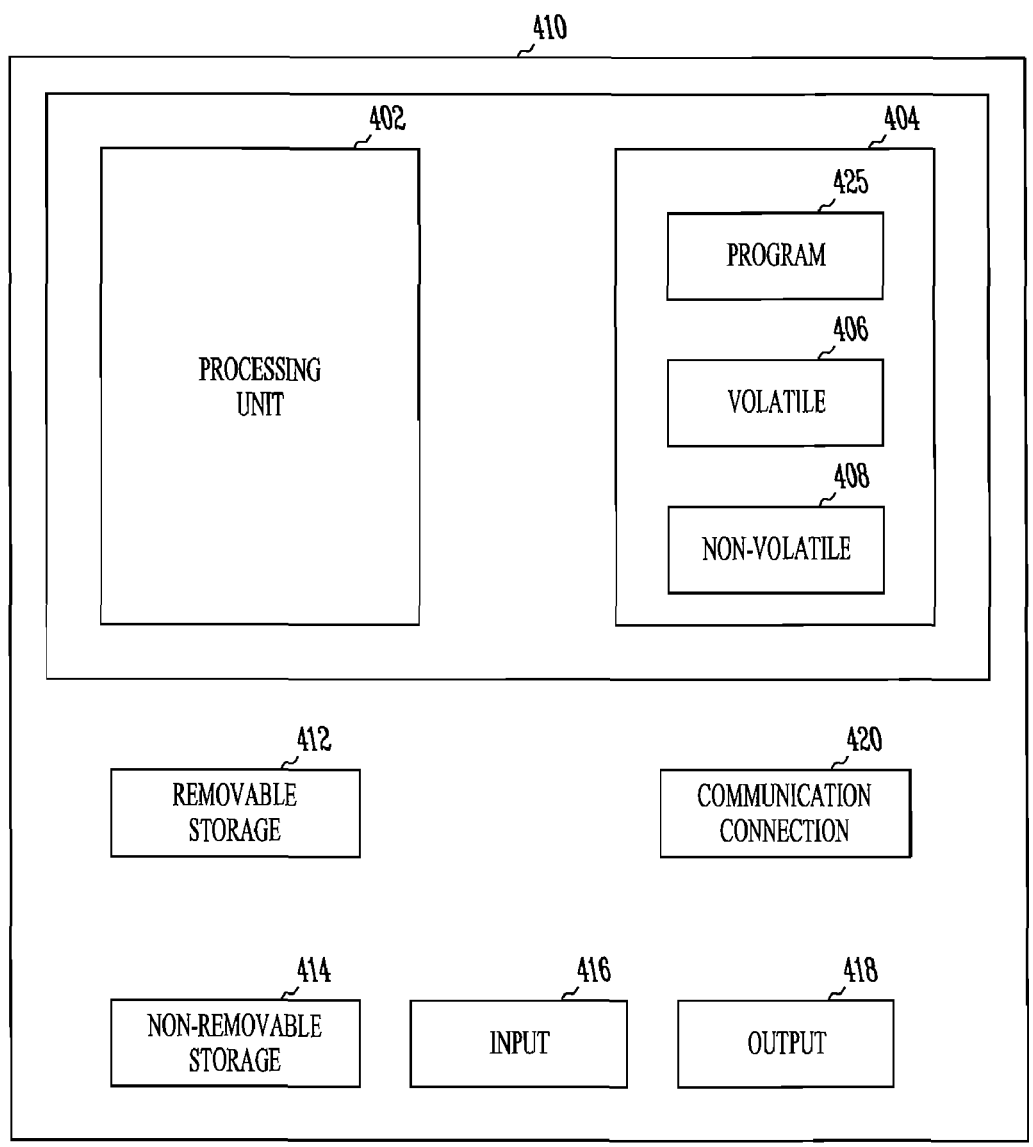
FIG. 4 is a block diagram of an example computer system for implementing various embodiments described.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein are implemented in software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wireless transmissions. Further, such functions correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system.

Master data processing enables a business organization to manage all master data that describes for example its tangible and intangible products and that is relevant to control its business processes, such as sales, purchasing, planning, production, and accounting processes.

Process controls are groups of attributes that execute software that automates a specific process involving a fundamental entity of a master data database. Fundamental entities are real world elements such as a bank, a terminal, a company, or a personal computer. Process controls are groups of attributes that are used to control a specific process step, and each process control offers a different view into an object. Process controls are used to model the master database, i.e., process controls define which attributes are relevant for a specific process step; the process control defines the set of attributes necessary to run a process. The process controls are defined to make the complexity of the database, which itself contains hundreds of attributes and in an embodiment many tables, more manageable. At a high level, process controls are defined according to an outside-in design approach along the lines of the processes it supports. That is, the process control is not concerned with what is in the database, but what the process control wants to retrieve for the outside world. In other words, a process control is designed for business reasons (what data a business organization wants to review) and not technical reasons (how should that data be retrieved from the database). In an embodiment, the process controls are defined at design time, and hence can be shipped to one or more customers. The process controls represent the process controlling business logic of a business system.

In one embodiment, some process controls are related to a material, such as a product to be sold, and a particular sales organization or distribution chain. If a process control is not usable, it is termed inactive. However, other process controls of the master data may be used, allowing business to continue. It should be noted that the terms material and product are just one form of master data used for illustration, and that master data relates to data for many different business processes. Further, references to a sales organization or distribution chain are also used as an example, and are not meant to be limiting.

In one embodiment, a status management module or process is used to manage the status of process controls. The status may be set by a user, or may be set by the a business system.

FIG. 1 is a block diagram representation 100 of the segmentation of process controls within a business management system. Master data is indicated at 110, and in one example used for illustration, may be divided into product master data for business to business products 115 and for non business to business products 120. Process control master data is maintained at 125. In one example, a product may be a developer laptop device, and the data includes all data sufficient to identify the device.

Process control master data 125 may include relevant data for use in selling or transporting goods. It may include external dimensions of products, such as length, width, height, weight that are useful for transport of the products. Further, data used to execute a sale or replenishment durations, codes, material sold, planning information, grouping of materials supply planning, warranty information and other terms and conditions of sale may be included among other information. The information may be different for different countries or sales organizations as indicated at 130.

Thus, each sales organization has a different instance of a process control for the sale of each product 135 or service 140. For instance, a sales organization may have different internal material identification numbers, different value added propositions, such as rebates, or different terms and conditions depending on jurisdictional differences, which may be based on country, state, or local regulations or preferences. In one embodiment, the process controls are represented by software objects.

Once a process control 135, 140 is finalized or otherwise ready for use, it may be used by product data processing 150 to actually sell products and services for the corresponding materials and service products for the corresponding organization.

In one embodiment, each process control is an object that has a current status. The status determines the actions that can be performed. The status may be set by a user or by the system. Various lifecycle statuses are one example. A status of "in preparation" means that the object is a preliminary version, for example, embodying the plans for a distribution channel to distribute material, such as a product or service. The object data may be incomplete and/or inconsistent. It would thus fail a consistency check. It is not possible to execute transactions on an object have an in preparation status.

A further status of a process control object is "active". This status means that an object is currently usable, object data is complete and consistent, and it is possible to execute transactions. In other words, where master data is related to the example of a product or material, the sales organization may sell the material or service product corresponding to the control object. An object having a status of active may have a validity period, but the status may not be set on core level.

A further status include a "blocked status". For the product or material example, this may be used for seasonal materials, or for materials currently experiencing a technical problem or for any other business reason where sales may not currently be desired. The status blocked means that an object is currently blocked and not usable, but may be used at a later time. It is not possible to execute new transactions on an object with a blocked status, but already existing transactions may be finalized. To have a blocked status, in one embodiment, all object data should be complete and consistent. This status may not be set on core level.

A still further status may include a "to be archived" status. This is meant to indicate that the object has been marked for archiving. It is not possible to execute new transactions on an object to be archived, but already existing transactions may be finalized. Once related business transactions are completed, the object may be archived. This status may only be set on core level.

When modifying process control objects with a status of in preparation, inconsistencies in the process control data may be presented as warnings. Using the limited example of master data related to a product, product master data may also be saved. When the status is not equal to in preparation, which may itself be referred to as a status, inconsistencies in process control data are presented as errors. Master may not be saved and the status may not be set to in preparation if this status has already been saved, as data can be already used in transactions.

An example is provided where a material has an ID of MCF-0002 that is assigned to two different distribution chains. A first process control object is exists for a US Southern Region. In this example, the first process control object is still in preparation as illustrated in an example user interface screen shot shown in FIG. 2. Multiple fields are provided for entering data, such as pricing, commissions, rebates, etc. An entry for the US Southern Region is shown at 210 and includes the status at 215. Data may be inconsistent as indicated at 220, where a minimum order quantity is negative. Inconsistencies are displayed as warning messages as indicated at 225. The process control object in this status may not be used in a process, so the US Southern Region may not conduct transactions for material MCF-0002.

The user interface of FIG. 2 also illustrates that the example process controls for sales may be part of a larger business process system that includes purchasing, inventory, planning, production, delivery, financials, etc. It may also be a stand alone system in further embodiments.

Figure 3:
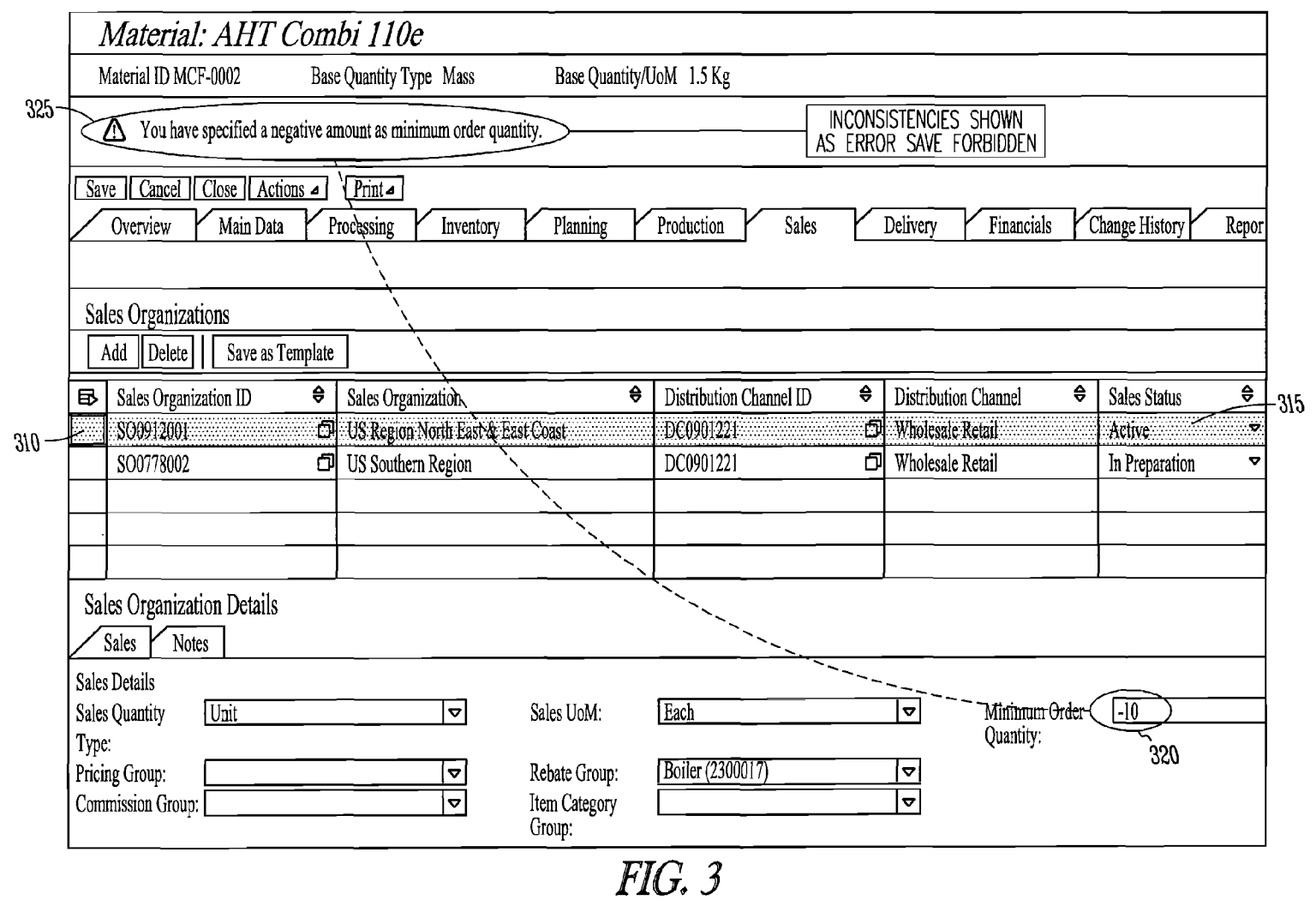

In a US Northern Region, a second process control is already active as illustrated in an example user interface screen shot shown in FIG. 3. This means that the data in it must be consistent. An entry for the US Northern Region is shown at 310 and includes the status at 315. Any inconsistencies, such as in a minimum order field 320 showing a negative value for minimum order quantity, that are created by attempting to change the second process control object may be displayed as an error message 325, preventing saving of the object.

A block diagram of a computer system that executes programming for performing the above algorithm is shown in FIG. 2. A general computing device in the form of a computer 410, may include a processing unit 402, memory 404, removable storage 412, and non-removable storage 414. Memory 404 may include volatile memory 406 and non-volatile memory 408. Computer 410 may include—or have access to a computing environment that includes—a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 402 of the computer 410. A hard drive, CD-ROM, and RAM are some examples of articles including a computer-readable medium.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:
1. A computer implemented method comprising:
   segmenting master data via a processor into separate process control objects stored on a storage device, each separate process control object identifying attributes of master data corresponding to a particular business process of a business organization and defining a set of attributes necessary to run the particular business process, each process control for performing business transactions on a product or service;
   setting a lifecycle status via the processor in a storage device for a process control object, wherein the lifecycle status defines whether the process control object is blocked from use or available to use to execute transactions;

controlling use of the process control object for execution of transactions by the processor as a function of the lifecycle status wherein the process control object provides a process driven view into the master data, identifying information corresponding to the product or service utilized in performing the business transactions.

2. The method of claim 1 wherein the lifecycle status has values of in preparation or not in preparation.

3. The method of claim 2 wherein inconsistencies in process control objects having a status of in preparation are presented as warnings.

4. The method of claim 2 wherein inconsistencies in process control objects having a status of in preparation allows saving of the process control data to the master data.

5. The method of claim 2 wherein inconsistencies in process control objects having a status of not in preparation prevent saving of the process control object to the master data.

6. The method of claim 5 wherein process control objects not in preparation have a status of active, corresponding to an ability to conduct a business transaction in accordance with the process control object.

7. The method of claim 2 wherein different entities within a business have different instances of the process control object, and wherein each instance has an independent status.

8. A computer implemented method comprising: segmenting master data via a processor into separate process control objects identifying attributes of master data, each separate process control object corresponding to a particular business process of a business organization for performing business transactions on a product or service, and each separate process control object defining a set of attributes necessary to run the particular business process;
setting a lifecycle status via the processor for a process control object, wherein the lifecycle status defines whether the process control object is blocked from use or available to use to execute business transactions;
controlling storing of the process control object into the master data on to a storage device as a function of the lifecycle status; and
processing business transactions via the processor using process control objects as a function of the corresponding process control object status wherein the process control object provides a process driven view into the master data, identifying information corresponding to the product or service utilized in performing the business transactions.

9. The method of claim 8 wherein the lifecycle status has values of in preparation or not in preparation.

10. The method of claim 9 wherein inconsistencies in process control object having a status of in preparation are presented as warnings.

11. The method of claim 9 wherein inconsistencies in process control objects having a status of in preparation allows saving of the process control object to the master data.

12. The method of claim 9 wherein inconsistencies in process control objects having a status of not in preparation prevent saving of the process control object to the master data.

13. The method of claim 12 wherein process control objects not in preparation have a status of active, corresponding to an ability to conduct business transaction in accordance with the process control object.

14. The method of claim 9 wherein inconsistencies include any master data attribute.

15. The method of claim 8 wherein one of the separate process control objects corresponds to a single product or service being sold through a single distribution chain.

16. A computer readable storage device having instructions for causing a computer to execute a method comprising:
segmenting master data via a processor into separate process control objects identifying attributes of master data, each separate process control object corresponding to a particular business process of a business organization for performing business transactions on a product or service, and each separate process control object defining a set of attributes necessary to run the particular business process;
setting a lifecycle status via the processor for a process control object, wherein the lifecycle status defines whether the process control object is blocked from use or available to use to execute business transactions;
controlling storing of the process control object into the master data on to a storage device as a function of the lifecycle status; and
processing business transactions via the processor using process control objects as a function of the corresponding process control object status, wherein the process control object includes information corresponding to the product or service utilized in processing the business transactions, wherein the process control object provides a process driven view into the master data.

17. The computer readable media of claim 16 wherein the status has values of in preparation or not in preparation, wherein inconsistencies in process control objects prevent saving of the process control objects to the master data.

18. The computer readable media of claim 17 wherein process control objects not in preparation have a status of active, corresponding to an ability to conduct business transaction in accordance with the process control objects.

* * * * *